Patented Nov. 22, 1932

1,888,705

UNITED STATES PATENT OFFICE

JAN TEPPEMA, OF AKRON, OHIO, ASSIGNOR TO THE GOODYEAR TIRE & RUBBER COMPANY, OF AKRON, OHIO, A CORPORATION OF OHIO

ANTIOXIDANT

No Drawing.  Application filed March 20, 1928. Serial No. 263,225.

My invention relates to the treatment of rubber and rubber like substances and it has particular relation to anti-oxidants or age-retarders for those materials. One of the objects of my invention is to provide a rubber compound that has exceptional resistance to the action of oxygen and other deteriorating agencies. Another object is to provide a novel method whereby articles of rubber having the above designated characteristics may be manufactured with a minimum of expense and effort.

Heretofore, it has been observed that certain chemicals, for example, the reaction products of aldehydes with amines, have when introduced into rubber compounds the effect of greatly slowing up or retarding the action of air and light upon the rubber, thereby materially prolonging the life of articles formed thereof. Most of the compounds thus far proposed have, however, been objectionable for various reasons. Certain of them, while very effective as antioxidants, possess highly disagreeable odors that are offensive or even poisonous to workmen employed in handling them. Others are objectionable because they are tacky masses which can be incorporated into rubber compounds only with difficulty. Still other compounds of the class can be manufactured only from relatively expensive ingredients and the cost of manufacturing them is, therefore, prohibitive.

This invention involves the discovery that certain azo-amino compounds, when incorporated in rubber, have excellent antioxidant or age-retarding properties. These compounds may be manufactured from relatively inexpensive ingredients. They are non-odorous and of crystalline character and may, therefore, be introduced into rubber compounds with a minimum of inconvenience. These amino-azo compounds are embraced by the type formula $RN=N-R_1NH_2$, in which R and $R_1$ are hydrocarbon radicals.

One compound of the class which is found to be particularly effective as an antioxident or age-retarder is p-amino azo benzene $(C_6H_5-N=NC_6H_4NH_2)$. This compound may be prepared by any convenient method known in the chemical arts. The method outlined on page 265 of "Practical Methods of Organic Chemistry" by Gattermann (translated by Schober and Babasinian), published by the MacMillan Co. of New York, is an example of one such method. A second compound of the same class which is also embraced within the scope of the invention is p-amino azo naphthalene which may be prepared by methods analogous to those outlined for the preparation of p-amino azo benzene.

Azo compounds embraced within the scope of this invention may be employed as antioxidants in most of the standard formulæ. The following is the formula of a compound in which substances of the class just discussed have been observed to be particularly efficient as antioxidants:

| | Parts |
|---|---|
| Pale crepe rubber (extracted) | 100 |
| Zinc oxide | 5 |
| Sulfur | 3 |
| Stearic acid | 1.5 |
| Hexamethylene tetramine | 1 |
| Antioxidant | 1 |

In the above formula, hexamethylene tetramine, which is itself active as an accelerator, is illustrative of the use of a typical accelerator with the antioxidants of the present invention.

Samples of material prepared in accordance with the preceding formula in which p-amino azo benzene and p-aminoazo napthalin were employed as antioxidants were subjected to vulcanization for varying periods of time. Certain of these samples were subjected to tests to ascertain their tensile strength and elasticity immediately after vulcanization and before any appreciable aging.

Other samples, similarly vulcanized, were subjected to aging in an oxygen bomb for a period of six days at a temperature of 50° C. and under a pressure of 150 pounds per square inch. The results of these various tests are contained in the following tables:

| Rubber containing 1 part p-amino azo benzene | | | | | |
|---|---|---|---|---|---|
| Time of cure in minutes | Stress in kgs./cm² at | | | Per cent elongation at break | Per cent increase in weight |
| | 500% elongation | 700% elongation | At break | | |
| 30 | 15 | 45 | 120 | 875 | |
| 50 | 23 | 80 | 165 | 825 | |
| 70 | 24 | 138 | 170 | 735 | |
| After aging six days in O₂ bomb at 50° C. and 150# per sq. in. | | | | | |
| 30 | 15 | 51 | 105 | 830 | .07 |
| 50 | 25 | 94 | 150 | 785 | .09 |
| 70 | 37 | 145 | 170 | 730 | .23 |
| Rubber containing 1 part p-amino azo napthalin | | | | | |
| 30 | 13 | 37 | 110 | 900 | |
| 50 | 21 | 70 | 145 | 825 | |
| 70 | 28 | 105 | 180 | 795 | |
| After aging six days in O₂ bomb at 50° C. and 150# per sq. in. | | | | | |
| 30 | 20 | 61 | 95 | 780 | .10 |
| 50 | 30 | 107 | 125 | 725 | .20 |
| 70 | 39 | 146 | 165 | 725 | .31 |

It will be evident from the preceding tables that compounds containing either p-amino azo benzene or p-amino azo napthalin are but little affected by the action of oxygen even when subjected to the relatively severe conditions existing during the tests. Indeed, in certain instances it would appear that the quality of the product was somewhat improved by artificial aging. Under similar circumstances, compounds containing no antioxidant would have been reduced to resin-like masses possessing little or no elasticity or tensile strength. The compounds discussed have little or no power as accelerators and they may therefore be introduced into most of the standard rubber formulæ without appreciably upsetting the so-called "balance" of the compound.

Although I have described in detail only the preferred embodiments of the invention, it will be apparent to those skilled in the art that it is not limited thereto, but that various minor modifications may be made therein without departing from the spirit of the invention or from the scope of the appended claims, wherein I intend to claim all features of patentable novelty inherent in the invention.

What I claim is:

1. A method of treating rubber which comprises incorporating therein a compound having the following structural formula: $RN=N-R_1NH_2$, in which R and $R_1$ are phenyl radicals.

2. A method of treating rubber which comprises incorporating therein an amino azo benzene.

3. A rubber product that has been vulcanized in the presence of a material having the following structural formula: $RN=N-R_1NH_2$, in which R and $R_1$ represent benzene radicals.

4. A rubber product that has been vulcanized in the presence of amino azo benzene.

5. A method of preserving rubber which comprises vulcanizing it in the presence of a material having the following structural formula: $RN=NR_1NH_2$, in which R and $R_1$ are radicals selected from the benzene series.

6. A rubber product that has been vulcanized in the presence of a material having the formula $RN=NR_1NH_2$, in which R and $R_1$ are radicals selected from the benzene series.

7. A method of preserving rubber which comprises subjecting it to vulcanization in the presence of p-amino azo benzene.

8. A rubber product that has been vulcanized in the presence of p-amino azo benzene.

9. A rubber product that has been vulcanized in the presence of a material having the formula $RN=NR_1$, in which R is a benzene radical containing only carbon and hydrogen and $R_1$ is an ammonia substituted benzene group consisting entirely of carbon, hydrogen and basic nitrogen.

10. A method of preserving rubber which comprises subjecting it to vulcanization in the presence of a material having the formula $RN=NR_1$, in which R is a benzene group and $R_1$ is an ammonia substituted benzene group consisting entirely of the ammonia radical, carbon and hydrogen.

11. The method of preserving rubber which comprises vulcanizing rubber in the presence of an active accelerator of vulcanization and an amino-azo aromatic hydrocarbon.

12. The method of preserving rubber which comprises vulcanizing rubber in the presence of an active accelerator of vulcanization and p-amino azo benzene.

13. A rubber product which has been vulcanized in the presence of an active accelerator of vulcanization and a material $RN=NR_1NH_2$ wherein R and $R_1$ are selected from a group embracing the members of the benzene series.

In witness whereof, I have hereunto signed my name at Akron, in the county of Summit and State of Ohio, U. S. A., this 19th day of March, 1928.

JAN TEPPEMA.